(12) United States Patent
Inoue et al.

(10) Patent No.: US 10,335,944 B2
(45) Date of Patent: Jul. 2, 2019

(54) ROBOT WRIST STRUCTURE

(71) Applicant: FANUC CORPORATION, Yamanashi (JP)

(72) Inventors: Toshihiko Inoue, Yamanashi (JP); Shunsuke Abiko, Yamanashi (JP); Tooru Nagai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/424,092

(22) Filed: Feb. 3, 2017

(65) Prior Publication Data

US 2017/0274524 A1 Sep. 28, 2017

(30) Foreign Application Priority Data

Mar. 23, 2016 (JP) .................................. 2016-058595

(51) Int. Cl.
*B25J 9/10* (2006.01)
*B25J 17/02* (2006.01)
*B25J 9/12* (2006.01)

(52) U.S. Cl.
CPC ............... *B25J 9/102* (2013.01); *B25J 9/126* (2013.01); *B25J 17/025* (2013.01);
(Continued)

(58) Field of Classification Search
CPC ........... B25J 17/025; B25J 9/102; B25J 9/126
(Continued)

(56) References Cited

U.S. PATENT DOCUMENTS 4,683,772 A * 8/1987 Colimitra ............. B25J 17/0283
74/417
5,735,627 A * 4/1998 Nagao ................. B25J 17/0283
285/147.3
(Continued)

FOREIGN PATENT DOCUMENTS

CN 101121264 A 2/2008
CN 102049784 A 5/2011
(Continued)

OTHER PUBLICATIONS

Japanese Office Action dated Feb. 27, 2018, in connection with corresponding JP Application No. 2016-058595 (4 pgs., including English translation).
(Continued)

*Primary Examiner* — Victor L MacArthur
*Assistant Examiner* — Joseph Brown
(74) *Attorney, Agent, or Firm* — Maier & Maier, PLLC

(57) ABSTRACT

A robot wrist structure includes a first wrist element, a second wrist element, and a third wrist element which are respectively rotatable about a first axis to a third axis; drive motors for the second and third wrist elements; and gear sets that reduce speeds of rotation of the drive motors. The gear sets respectively include a driven-side large-diameter gear that rotates the second wrist element and a driven-side small-diameter gear that rotates the third wrist element, where the driven-side large-diameter gear and the driven-side small-diameter gear are coaxially arranged so as to be rotatable about the second axis. The small-diameter gear is fixed to a drive-side bevel gear that meshes with a driven-side bevel gear fixed to the third wrist element. The second wrist element includes a first housing that is fixed to the large-diameter gear; and a second housing rotatably supports the third wrist element.

2 Claims, 6 Drawing Sheets

(52) U.S. Cl.
CPC .......... B25J 17/0283 (2013.01); *Y10S 901/23* (2013.01); *Y10S 901/26* (2013.01)

(58) Field of Classification Search
USPC ..................... 74/490.03, 490.06; 901/29, 26
See application file for complete search history.

(56) References Cited

U.S. PATENT DOCUMENTS

| | | | |
|---|---|---|---|
| 5,894,761 | A | 4/1999 | Danielsson et al. |
| 5,924,330 | A | 7/1999 | Danielsson et al. |
| 5,934,148 | A | 8/1999 | Haniya et al. |
| 8,347,753 | B2 * | 1/2013 | Larsson ............... B25J 19/0029 |
| | | | 74/490.01 |
| 9,056,397 | B2 * | 6/2015 | Okada ...................... B25J 9/102 |
| 2004/0261562 | A1 | 12/2004 | Haniya et al. |
| 2008/0034920 | A1 | 2/2008 | Inoue et al. |
| 2010/0229671 | A1 | 9/2010 | Haniya et al. |
| 2011/0106302 | A1 | 5/2011 | Long |
| 2012/0034022 | A1 * | 2/2012 | Long ........................ B25J 9/102 |
| | | | 403/81 |
| 2012/0266720 | A1 * | 10/2012 | Oka ..................... B25J 17/0283 |
| | | | 74/665 H |
| 2013/0074651 | A1 * | 3/2013 | Furuichi ................. B25J 9/042 |
| | | | 74/665 L |
| 2013/0081502 | A1 * | 4/2013 | Long ........................ B25J 9/102 |
| | | | 74/490.04 |
| 2013/0319160 | A1 | 12/2013 | Oikawa |
| 2014/0318298 | A1 * | 10/2014 | Inoue ....................... B25J 17/02 |
| | | | 74/490.03 |
| 2016/0008989 | A1 * | 1/2016 | Bakir ......................... B25J 9/06 |
| | | | 74/490.03 |

FOREIGN PATENT DOCUMENTS

| | | |
|---|---|---|
| CN | 102343592 A | 2/2012 |
| CN | 103448073 A | 12/2013 |
| CN | 203697030 U | 7/2014 |
| EP | 1 7886 773 A1 | 2/2008 |
| JP | H09-272094 A | 10/1997 |
| JP | H10-512814 A | 12/1998 |
| JP | 2005-096073 A | 4/2005 |
| JP | 4233578 B2 | 2/2008 |
| JP | 2010-269400 A | 12/2010 |
| JP | 2011-020219 | 2/2011 |
| JP | 2014-237206 A | 12/2014 |

OTHER PUBLICATIONS

Chinese Office Action dated Dec. 26, 2018, in connection with corresponding CN Application No. 201710072199.2 (11 pgs., including machine-generated English translation).

Japanese Search Report dated Feb. 22, 2018, in connection with corresponding JP Application No. 2016-058595 (15 pgs., including machine-generated English translation).

* cited by examiner

ROBOT WRIST STRUCTURE

CROSS-REFERENCE TO RELATED APPLICATIONS

This application is based on Japanese Patent Application No. 2016-058595, the contents of which are incorporated herein by reference.

FIELD

The present invention relates to a robot wrist structure.

BACKGROUND

A robot wrist structure that includes a first wrist element rotatable about a first axis, a second wrist element supported by the first wrist element so as to be rotatable about a second axis orthogonal to the first axis, and a third wrist element supported by the second wrist element so as to be rotatable about a third axis orthogonal to the second axis is known in the art (for example, refer to Patent Literature 1).

In this wrist structure, powers output from a second wrist motor and a third wrist motor installed in the first wrist element are transmitted to the second wrist element and the third wrist element via two hypoid gear sets each equipped with a pinion gear and a ring gear.

The two ring gears are coaxially arranged. The ring gear on the radially outer side drives the second wrist element by reducing the speed of rotation of one of the wrist motors, and the ring gear on the radially inner side drives the third wrist element via a bevel gear inside a second driving element by reducing the speed of rotation of the other wrist motor.

According to the wrist structure described in Patent Literature 1, the second wrist element includes a first housing equipped with an output flange fixed to the ring gear on the radially outer side, a second housing fixed to the output flange of the first housing, and a third housing fixed to the first housing and the second housing. The first housing houses a drive-side bevel gear of the third wrist element fixed to the ring gear on the radially inner side. The third housing rotatably supports the third wrist element and houses a driven-side bevel gear.

The second housing functions as a component that connects the first housing to the third housing. These three housings are fastened to one another with screws and fixed by being set in place with locating pins.

Patent Literature 1, described above, is the Publication of Japanese Patent No. 4233578.

SUMMARY

The present invention provides the following solutions.

A first aspect of the present invention provides a robot wrist structure that includes a first wrist element cantilevered so as to be rotatable about a first axis; a second wrist element cantilevered by the first wrist element so as to be rotatable about a second axis that intersects the first axis; a third wrist element cantilevered by the second wrist element so as to be rotatable about a third axis that intersects the second axis; two drive motors disposed in the first wrist element, the two drive motors being configured to drive the second wrist element and the third wrist element, respectively; and two gear sets that reduce speeds of rotation of the drive motors. One of the gear sets includes a driven-side large-diameter gear that rotates the second wrist element and the other of the gear sets includes a driven-side small-diameter gear that rotates the third wrist element, where the driven-side large-diameter gear and the driven-side small-diameter gear are coaxially arranged so as to be rotatable about the second axis. The driven-side small-diameter gear is fixed to a drive-side bevel gear that meshes with a driven-side bevel gear fixed to the third wrist element. The second wrist element includes a first housing that is fixed to the driven-side large-diameter gear and has a flange face extending all around the circumference and being positioned to expose the drive-side bevel gear in an axis direction; and a second housing that is fixed to the flange face of the first housing and rotatably supports the third wrist element.

According to the aspect described above, the first housing may include a cylinder face or cylinder inner face whose center lies on the second axis and which is adjacent to the flange face. Moreover, the second housing may include a fitting face that fits into the cylinder face or cylinder inner face.

According to the aspect described above, an annular seal member may be disposed between the first housing and the second housing.

DETAILED DESCRIPTION

A robot wrist structure 1 according to one embodiment of the present invention will now be described with reference to the drawings.

Figure 1:
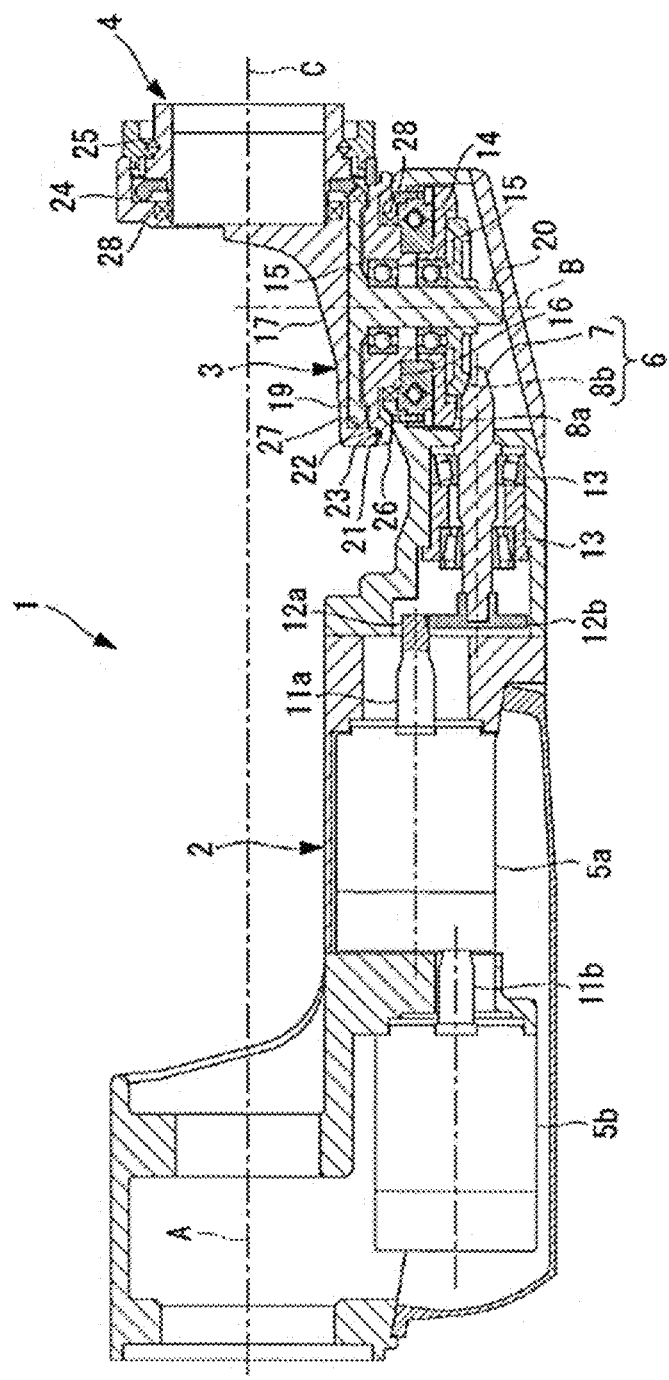
FIG. 1 is a longitudinal sectional view of a robot wrist structure according to one embodiment of the present invention.

As illustrated in FIG. 1, the robot wrist structure 1 according to this embodiment includes a first wrist element 2, a second wrist element 3, and a third wrist element 4.

The first wrist element 2 is cantilevered at a leading end of a robot arm (not shown in the drawing) so that the first wrist element 2 is rotatable about a first axis A coincident with the longitudinal axis of the robot arm.

The second wrist element 3 is cantilevered at a leading end of the first wrist element 2 so that the second wrist element 3 is rotatable about a second axis B orthogonal to the first axis A.

The third wrist element 4 is cantilevered at a leading end of the second wrist element 3 so that the third wrist element 4 is rotatable about a third axis C orthogonal to the second axis B.

The first wrist element 2, the second wrist element 3, and the third wrist element 4 constitute a so-called in-line wrist in which the first axis A, the second axis B, and the third axis C intersect one another at one point.

The first wrist element 2 is equipped with two servo motors (drive motors) 5a and 5b that respectively drive the second wrist element 3 and the third wrist element 4, and two hypoid gear sets (gear sets) 6 that respectively reduce the speeds of rotation of the servo motors 5a and 5b at particular reduction ratios.

Figure 6:
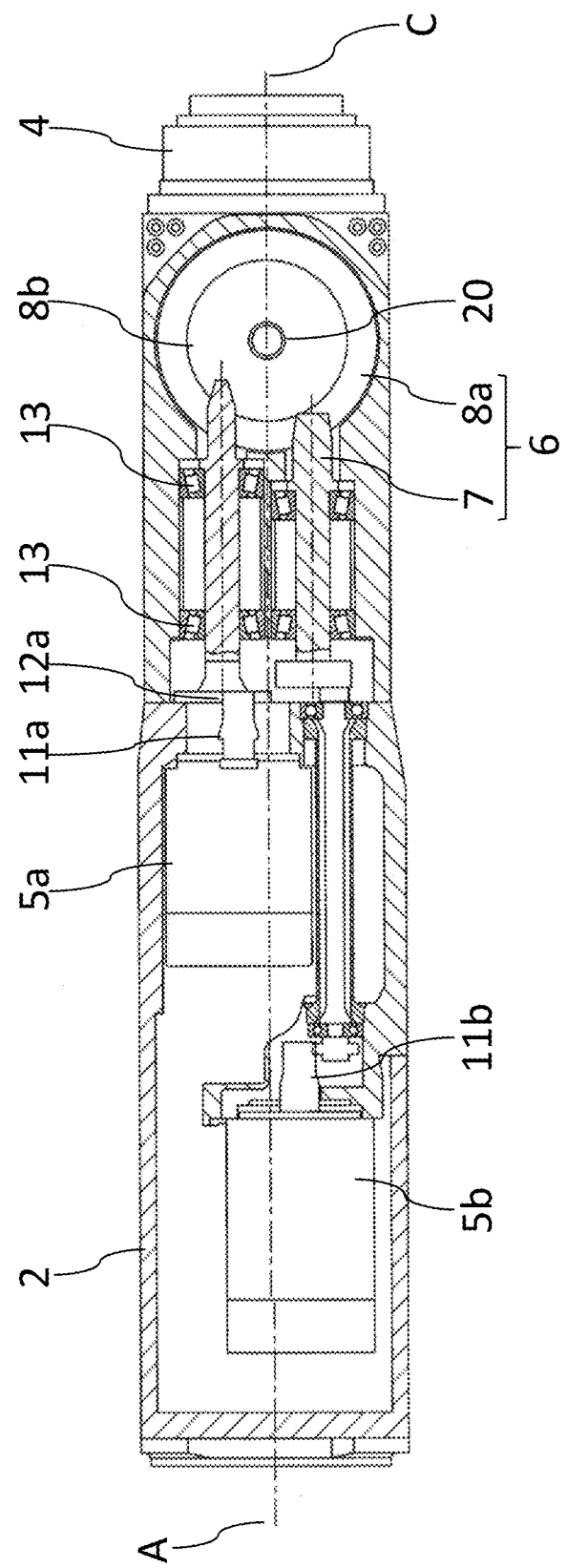
FIG. 6 is a longitudinal sectional view of a robot wrist structure according to an embodiment of the present invention.

The two hypoid gear sets 6 respectively include pinion gears 7 driven by the servo motors 5a and 5b, and ring gears 8a and 8b that respectively mesh with the pinion gears 7. This relation can also be seen in detail in FIG. 6, which shows hypoid gear set 6 having a pinion gear 7 and ring gear 8a.

The two ring gears 8a and 8b are arranged to share the second axis B so as to be coaxially rotatable, and respectively constitute a driven-side large-diameter gear (hereinafter may be referred to as a "large-diameter gear 8a") disposed on the radially outer side and a driven-side small-diameter gear (hereinafter may be referred to as a "small-diameter gear 8b") disposed on the radially inner side.

The two servo motors 5a and 5b are disposed at positions shifted from each other in the longitudinal direction of the first axis A. Output shafts 11a and 11b of the two servo motors 5a and 5b are disposed at positions offset from each other in a direction orthogonal to the plane that includes the first axis A and the second axis B.

The output shaft 11a of the servo motor 5a is coupled to one of the pinion gears 7 via a pair of spur wheels (or helical gears or the like) 12a and 12b. This pinion gear 7 is rotatably supported by a pair of bearings 13 and meshes with the small-diameter gear 8b at a position offset in one direction with respect to the plane that includes the first axis A and the second axis B.

The output shaft 11b of the servo motor 5b is coupled to the other pinion gear via a pair of spur wheels (or helical gears or the like), a drive shaft, and another pair of spur wheels (or helical gears or the like) not illustrated in the drawing. This pinon gear is also rotatably supported by a pair of bearings and meshes with the large-diameter gear 8a at a position offset in the other direction with respect to the plane that includes the first axis A and the second axis B.

As a result, the two pinion gears 7 are arranged parallel to each other on both sides of the plane that includes the first axis A and the second axis B. This relation is shown in more detail in FIG. 6, which shows that the output shaft 11b of the servo motor 5b is coupled to the other pinion gear 7 via a pair of spur wheels such as spur wheel 12a (or helical gears or the like), a drive shaft, and another pair of spur wheels (or helical gears or the like).

The second wrist element 3 includes a first housing 16 and a second housing 17 attached to the first housing 16 fixed to the large-diameter gear 8a. The first housing 16 is supported by the first wrist element 2 with the bearing 14 so as to be rotatable about the second axis B.

The first housing 16 houses a shaft 20. The shaft 20 is supported by a pair of bearings 15 so as to be rotatable about the second axis B and has one end fixed to the small-diameter gear 8b and the other end fixed to a drive-side bevel gear 19.

Figure 3:
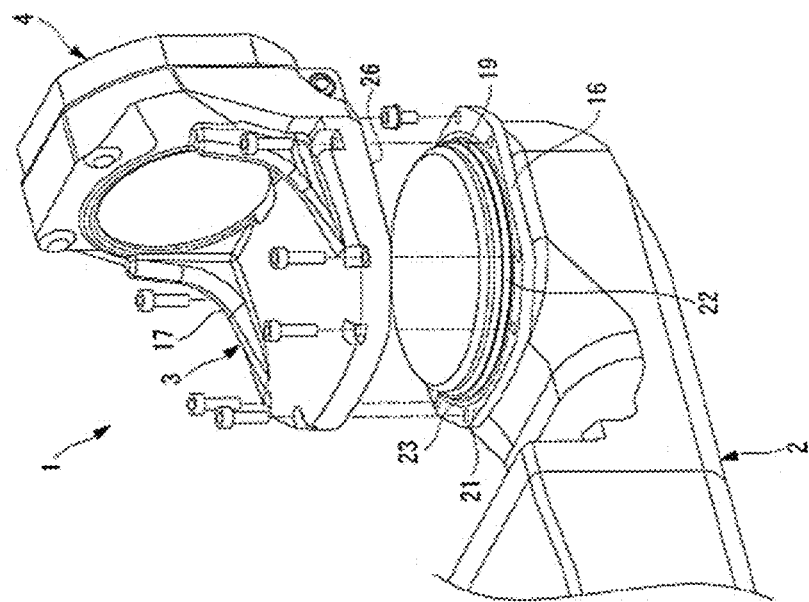
FIG. 3 is an exploded perspective view of the wrist structure illustrated in FIG. 1.

As illustrated in FIGS. 1 and 3, the first housing 16 includes a flange face 21 to which the second housing 17 is fastened and a cylinder face 22 protruding from the flange face 21. The cylinder face 22 is positioned on the radially inner side of the flange face 21. The flange face 21 is disposed at a position shifted in the axis direction of the second axis B toward the small-diameter gear 8b with respect to the drive-side bevel gear 19 so that the space on the radially outer side of the drive-side bevel gear 19 is exposed all around the circumference.

In this manner, the flange face 21 and the cylinder face 22 continuously extend all around the circumference about the second axis B without any breaks. A ring-shaped O ring groove 23 extending all around the circumference at a position that surrounds the cylinder face 22 is formed in the flange face 21 of the first housing 16. The O ring groove 23 is configured to receive an O ring (not illustrated in the drawing).

The third wrist element 4 and a driven-side bevel gear 24 fixed to the third wrist element 4 are supported by the second housing 17 so as to be rotatable about the third axis C by a bearing 25. The second housing 17 includes a flange face 26 in close contact with the flange face 21 of the first housing 16 and a fitting face formed of a cylinder inner face 27 to be fitted to the cylinder face 22.

When the cylinder inner face 27 is fitted and fastened to the cylinder face 22 to bring the flange faces 21 and 26 in close contact with each other, the drive-side bevel gear 19 exposed from the flange face 21 of the first housing 16 in the axis direction of the second axis B and the driven-side bevel gear 24 housed in the second housing 17 become meshed with each other.

In the drawings, reference numeral 28 denotes a ring-shaped seal member that seals the gap between the first wrist element 2 and the second wrist element 3 and the gap between the second wrist element 3 and the third wrist element 4.

The operation of the robot wrist structure 1 according to this embodiment configured as mentioned above will now be described.

According to the robot wrist structure 1 of this embodiment, when the servo motor 5b installed in the first wrist element 2 is activated, the drive force of the servo motor 5b is transmitted to the second wrist element 3 fixed to the large-diameter gear 8a via a pair of spur wheels, a drive shaft, and another pair of spur wheels which are not illustrated in the drawing, and a hypoid gear set including a pinion gear and the large-diameter gear 8a. As a result, the second wrist element 3 can be made to rotate about the second axis B. This relation can be seen in more detail in FIG. 6, which shows that the drive force of the servo motor 5b may be applied through the output shaft 11b to the large diameter gear 8a that is fixed to the second wrist element.

When the servo motor 5a installed in the first wrist element 2 is activated, the drive force of the servo motor 5a is transmitted to the third wrist element 4 fixed to the driven-side bevel gear 24 via a pair of spur wheels 12a and 12b, the hypoid gear set 6 that includes the pinion gear 7 and the small-diameter gear 8b, the drive-side bevel gear 19, and the driven-side bevel gear 24. As a result, the third wrist element 4 can be made to rotate about the third axis C. This relation can be seen in more detail in FIG. 6.

Figure 4:
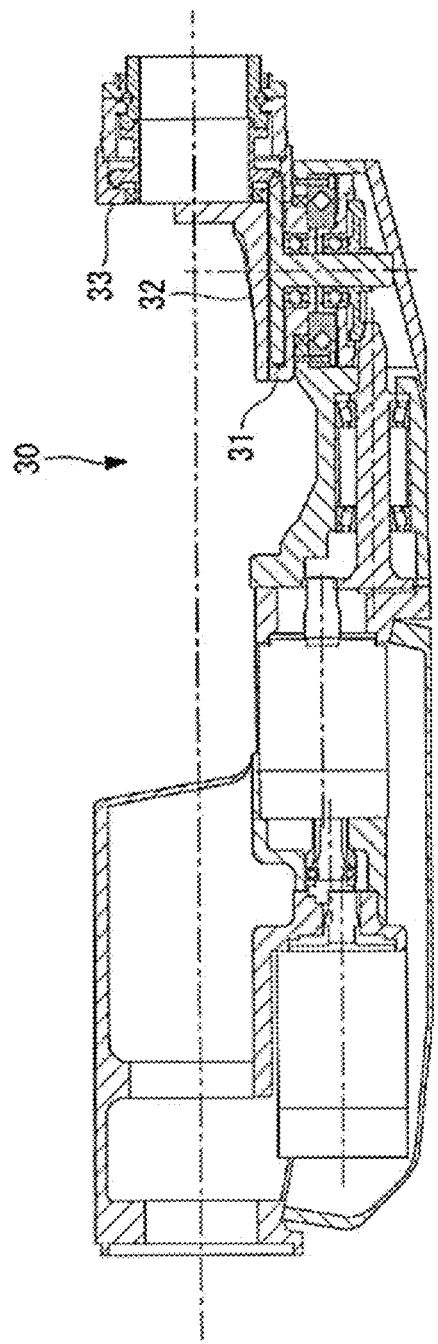
FIG. 4 is a longitudinal sectional view of a robot wrist structure according to the related art.
Figure 5:
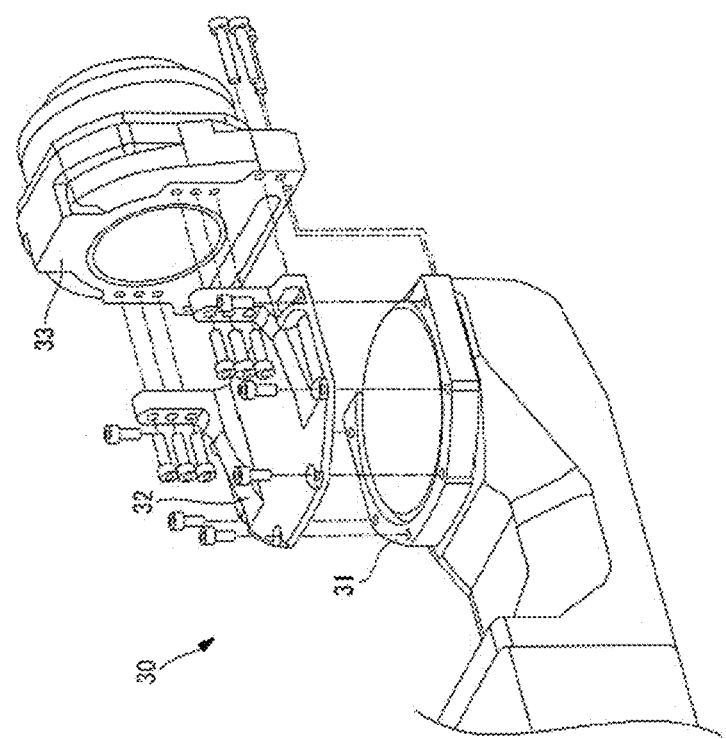
FIG. 5 is an exploded perspective view of the wrist structure illustrated in FIG. 4.

In this case, according to the robot wrist structure 1 of this embodiment, the flange face 21 of the first housing 16 constituting the second wrist element 3 is positioned to expose the drive-side bevel gear 19 in the axis direction. Thus, unlike a robot wrist structure 30 of the related art illustrated as a reference example in FIGS. 4 and 5, there is no need to cut out part of a flange face 31 in the circumferential direction in order to make the drive-side bevel gear 19 mesh with the driven-side bevel gear 24. In other words, the flange face 21 is provided all around the circumference about the second axis B without any break and thus, unlike the robot wrist structure 30 of the related art, there is no need to provide two divided second housings 32 and 33, and thus the number of parts can be reduced to cut the cost, which is an advantage.

Since there is no need to cut out the flange face 21, a cylinder face 22 that extends all around the circumference about the second axis B can be formed adjacent to the flange face 21, and the first housing 16 and the second housing 17 can be aligned by fitting the cylinder face 22 into the cylinder inner face 27. Thus, there is no need to conduct aligning by using pins, and the number of parts, the processing cost, and the assembly cost can all be reduced.

Since there is no need to cut out the flange face 21, an O ring groove 23 that extends all around the circumference about the second axis B can be formed so that the O ring groove 23 is positioned to surround the radially outer side of the cylinder face 22. Thus, the first housing 16 and the second housing 17 can be sealed with the O ring all around the circumference without any breaks. As a result, sealability can be improved, which is an advantage.

In this embodiment, the cylinder face 22 protruding from the flange face 21 of the first housing 16 is fitted into the fitting face formed of the cylinder inner face 27 of the second housing 17. Alternatively, a cylinder inner face set back from the flange face 21 of the first housing 16 can be fitted into a fitting face formed of a protruding cylinder face of the second housing 17.

Figure 2:
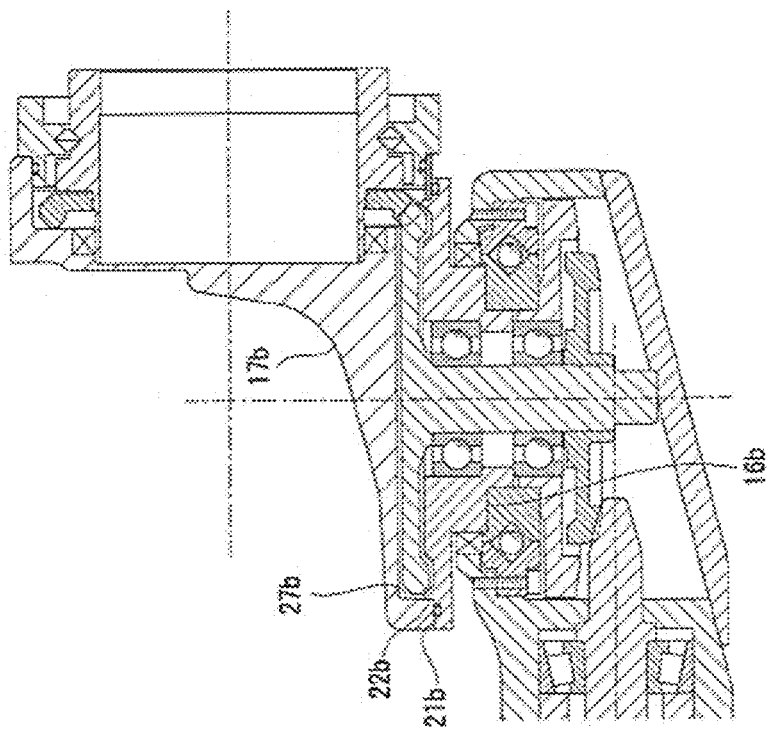
FIG. 2 is a longitudinal sectional view of a robot wrist structure according to another embodiment of the present invention.

In this embodiment, the flange face 21 of the first housing 16 is positioned so as to expose the drive-side bevel gear 19 in the axis direction. Alternatively, as with a first housing 16b illustrated in FIG. 2, a cylinder face 22b may be made to protrude from a flange face 21b so that the cylinder face 22b fits into a cylinder face 27b formed in a second housing 17b.

The O ring groove 23 is formed in the flange face 21 to seal the gap between the flange faces 21 and 26 with the O ring. Alternatively, the O ring groove 23 may be formed in the cylinder face 22 or the cylinder inner face 27. Instead of the O ring, a sheet-shaped seal member formed of an elastic material may be provided between the flange faces 21 and 26. In such a case, the seal member may have a ring shape or any other annular shape.

As a result, the following aspect is read by the above described embodiment of the present invention.

According to the aspect, when one of the drive motors installed in the first wrist element is activated, the speed of rotation of this drive motor is reduced by one of the gear sets and the second wrist element fixed to the driven-side large-diameter gear can be rotated about the second axis. When the other drive motor is activated, the speed of rotation of this drive motor is reduced by the other gear set and the drive-side bevel gear fixed to the driven-side small-diameter gear is rotated about the second axis.

Since the drive-side bevel gear meshes with the driven-side bevel gear fixed to the third wrist element, the rotation force of the drive-side bevel gear is transmitted to the driven-side bevel gear and the third wrist element is rotated about the third axis.

According to this configuration, the two drive motors installed in the first wrist element can independently rotate the second wrist element and the third wrist element about axes that intersect each other.

In such a case, because the first housing constituting the second wrist element has a flange face extending all around the circumference and being positioned to expose the drive-side bevel gear in an axis direction and the second housing that supports the third wrist element is fixed to the flange face of the first housing, a flat and continuous joint face that lies all around the circumference about the second axis can be formed between the two housings. That is to say, there is no need to divide a second housing into two parts and thus the number parts can be reduced and the cost therefor can be reduced.

The flat and continuous joint face formed all around the circumference about the second axis and between two housings can be easily sealed by using a single annular seal member without any break. Moreover, since the flange face is formed all around the circumference about the second axis, alignment using spigot joints can be easily achieved. As a result, workability, assemblability, and sealability can be improved.

According to the aspect described above, the first housing may include a cylinder face or cylinder inner face whose center lies on the second axis and which is adjacent to the flange face. Moreover, the second housing may include a fitting face that fits into the cylinder face or cylinder inner face.

According to this configuration, in fastening the second housing to the flange face of the first housing, the alignment of the second axis and the third axis can be easily achieved by fitting the cylinder face or cylinder inner face of the first housing into the fitting face of the second housing without using pins. Thus, assemblability can be improved.

According to the aspect described above, an annular seal member may be disposed between the first housing and the second housing.

According to this configuration, the gap between the first housing and the second housing can be easily sealed with an annular seal member without any breaks and thus the sealability can be improved.

REFERENCE SIGNS LIST 1, 30 robot wrist structure
2 first wrist element
3 second wrist element
4 third wrist element
5a, 5b servo motor (drive motor)
6 hypoid gear set (gear set)
8a driven-side large-diameter gear (large-diameter gear)
8b driven-side small-diameter gear (small-diameter gear)
16, 16b first housing
17, 17b, 32, 33 second housing
19 drive-side bevel gear
21, 21b, 26, 31 flange face
22, 22b cylinder face
24 driven-side bevel gear
27 cylinder inner face (fitting face)
28 seal member
A first axis
B second axis
C third axis

The invention claimed is:

1. A robot wrist structure comprising:
a first wrist element cantilevered so as to be rotatable about a first axis;
a second wrist element cantilevered by the first wrist element so as to be rotatable about a second axis that intersects the first axis;
a third wrist element cantilevered by the second wrist element so as to be rotatable about a third axis that intersects the second axis;
two drive motors disposed in the first wrist element, the two drive motors being configured to drive the second wrist element and the third wrist element, respectively; and
two gear sets that reduce speeds of rotation of the drive motors,
wherein one of the gear sets includes a driven-side large-diameter gear that rotates the second wrist element and another of the gear sets includes a driven-side small-diameter gear that rotates the third wrist element, where the driven-side large-diameter gear and the driven-side small-diameter gear are coaxially arranged so as to be rotatable about the second axis, and the second wrist element includes a first housing that is fixed to the driven-side large-diameter gear and a second housing that rotatably supports the third wrist element, wherein a shaft that is supported so as to be rotatable about the second axis and has one end fixed to the driven-side small-diameter gear and the other end fixed to a drive-side bevel gear is accommodated in the first housing;

the drive-side bevel gear is meshed with a driven-side bevel gear fixed to the third wrist element;

the first housing has a flange face;

the flange face is disposed at a position displaced to a side on which the driven-side small-diameter gear is located, and about an entire circumference of the drive-side bevel gear;

the second housing is fixed to the flange face;

the first housing includes a cylinder inner face set back from the flange face and whose center lies on the second axis and which is adjacent to the flange face, and the first housing is gradually decreased in height in a stepwise manner in a radial direction between an unner surface of the first housing and the flange face, wherein the flange face is the most radial outward surface relative to the second axis;

the second housing includes a fitting face that is formed of a protruding cylinder face, wherein the drive-side bevel gear is meshed with the driven-side bevel gear by fitting and fastening the cylinder inner face to the fitting face to bring the second housing in close contact with the first housing.

2. The robot wrist structure according to claim 1, wherein an annular seal member is disposed between the first housing and the second housing.

\* \* \* \* \*